G. C. LOBB.
TRACTOR.
APPLICATION FILED APR. 24, 1916.

1,235,822.

Patented Aug. 7, 1917.
2 SHEETS—SHEET 1.

Witnesses
A. H. Opsahl.
E. C. Wells

Inventor
Geo. C. Lobb.
By his Attorneys
Williamson & Merchant

G. C. LOBB.
TRACTOR.
APPLICATION FILED APR. 24, 1916.
1,235,822.
Patented Aug. 7, 1917.
2 SHEETS—SHEET 2.
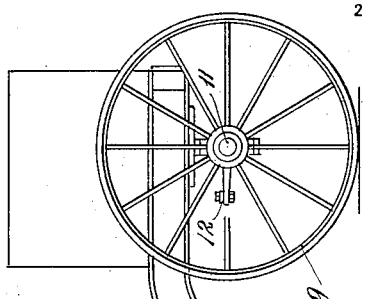
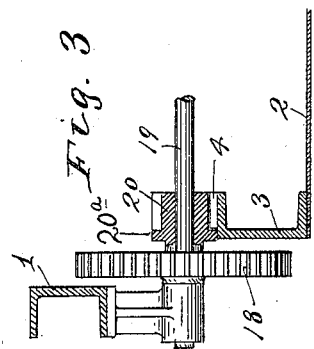
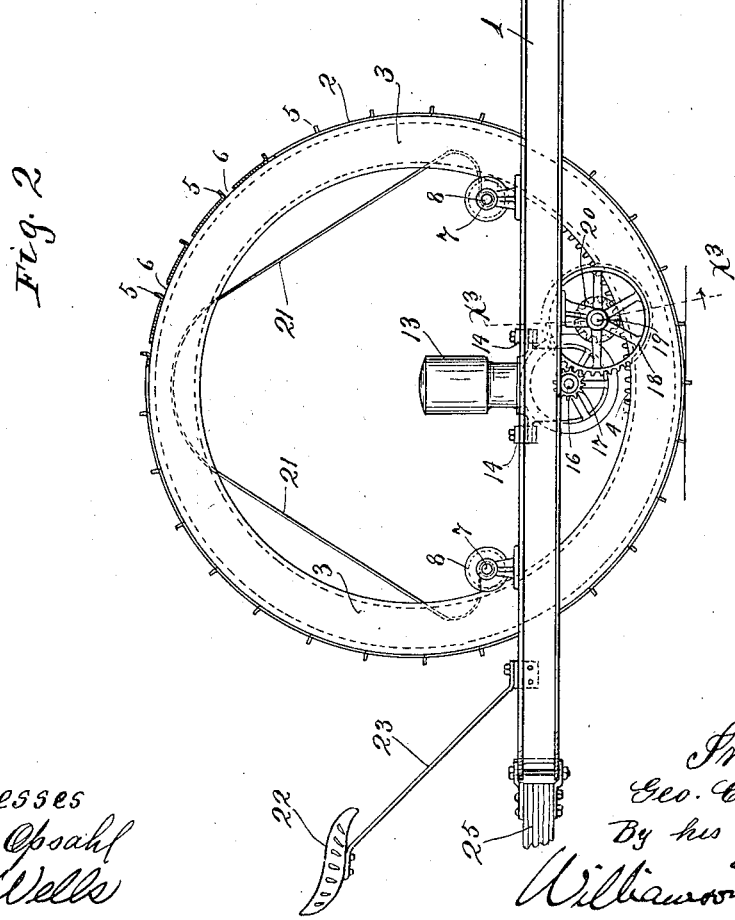
Witnesses
A. H. Opsahl
E. C. Wells
Inventor
Geo. C. Lobb.
By his Attorneys
Williamson Merchant

UNITED STATES PATENT OFFICE.

GEORGE C. LOBB, OF WINNEBAGO, MINNESOTA.

TRACTOR.

1,235,822.   Specification of Letters Patent.   Patented Aug. 7, 1917.

Application filed April 24, 1916. Serial No. 93,053.

*To all whom it may concern:*

Be it known that I, GEORGE C. LOBB, a citizen of the United States, residing at Winnebago, in the county of Faribault and State of Minnesota, have invented certain new and useful Improvements in Tractors; and I do hereby declare the following to be a full, clear, and exact description of the invention, such as will enable others skilled in the art to which it appertains to make and use the same.

My invention has for its object to provide an extremely simple and highly efficient tractor, and to such ends, generally stated, the invention consists of the novel devices and combinations of devices hereinafter described and defined in the claims.

In this improved tractor, I employ a very large wide-faced traction wheel or drum located at the rear of the machine, and the engine and transmission mechanism are located within this traction wheel. Furthermore, the said traction wheel is of annular form without hub or central axle and is journaled to the frame by means of laterally and longitudinally spaced guide rollers that are directly journaled to bearings on the main frame. The front portion of the tractor frame is carried by a pair of guide wheels spaced apart so that one runs just outward of the right hand side and the other just outward of the left hand side of the traction wheel. The draw bar is preferably applied to the central rear portion of the tractor frame. With this arrangement, very great traction is afforded and the tractor may be used without change or re-adjustment, either for right or left hand plowing, that is, in connection with either right or left hand plows, and the one or the other of the front steering wheels will always run in a previously formed furrow, so that it may be used to automatically guide the tractor. The invention also involves other minor but important features of construction.

The invention is illustrated in the accompanying drawings, wherein like characters indicate like parts throughout the several views. Referring to the drawings:

Fig. 2 is a side elevation of the tractor, with parts being sectioned; and

Fig. 3 is a detail in section on the line $x^3$ $x^3$ of Fig. 2, some parts being shown in full and some parts being broken away.

Figure 1:
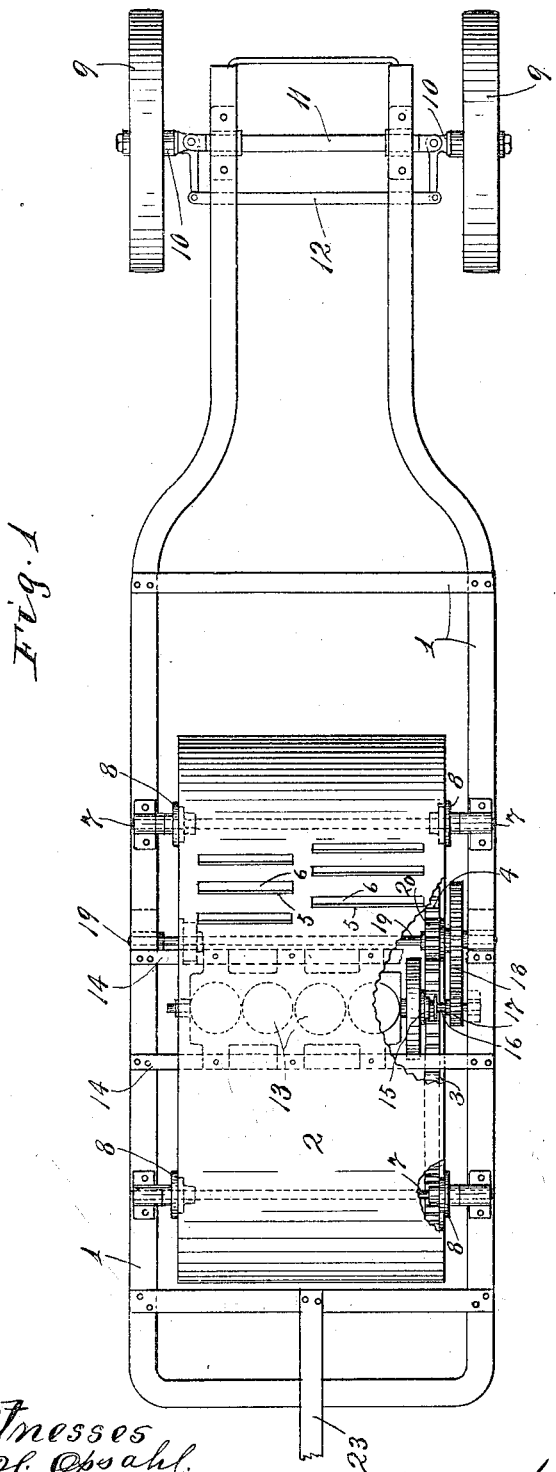
Figure 1 is a plan view of the improved tractor with some parts broken away and some parts removed.

The tractor frame 1 is preferably made from commercial channel iron and has an approximately rectangular form that is contracted somewhat at its front portion. The large annular traction wheel or drum is made up of a cylindrical shell 2 and laterally spaced annular rims or rings 3 located within the shell 2 and rigidly secured to the same, adjacent to its edges. These rims 3 are preferably channel-shaped in cross section, as best shown in Fig. 3 and their inner flanges are provided with gear teeth 4 that extend less than through the outer faces of the said rims.

The cylindrical shell 2, as preferably constructed, is provided with peripheral openings formed by slitting the same and turning outward the slit portions to form traction lugs 5 and intervening slots 6. The rear portion of the frame 1 is hung from the said traction wheel by means of shafts 7 provided with flanged rollers 8 that engage the inner edges of the vertical annular flanges or rims 3, and thus serve to journal the traction wheels to the truck frame. Other rollers might be provided for engagement with the extreme upper portions of the rims 3, but such are not absolutely necessary, because the weight of the load is carried on lower roller-acting pinions hereinafter described. The front portion of the truck frame is carried by the front wheels 9, which, as shown, are journaled to stub axles 10 pivoted to the front axle 11 rigidly secured to the front portion of the truck frame. The stub shafts 10 are provided with arms connected by a link 12 for parallel steering movements. Any of the well known or suitable steering devices for oscillating the link 12 may be provided, but as these constitute no part of the present invention, they are not shown.

The motor for driving the tractor is preferably a multi-cylinder explosive engine 13 that is located within the large traction wheel and, as shown, is anchored to cross bars 14 secured to the side bars of the truck frame 1 and extended through the wheel. The crank shaft of this engine, by means of a clutch 15, is adapted to be connected, at will, to a short shaft 16 journaled in suitable bearings on the frame 1 and equipped with a pinion 17 that engages a spur gear 18 on a transverse counter shaft 19. This counter shaft 19 is provided with spur pinions 20 that engage the gear teeth 4 on the wheel rims 3. The transmission mechanism described is illustrative only, and in practice, it will be understood that any suitable transmission mechanism between the engine and traction wheel may be employed.

The driving pinions 20 (see particularly Fig. 3), are provided with unbroken annular flanges 20ª that engage continuous annular bearing surfaces on the wheel member 3. These pinions, therefore, act as rollers and they carry the greater part of the weight of the rear portion of the tractor frame and its load. The flanged rollers 8, of course, keep the drum from traveling ahead or rearward, in respect to the engine or motor and tractor frame, or, in other words, keep the same properly journaled to the main frame.

More or less dirt will be forced through the openings in the shell of the traction wheel or drum, and to prevent this from falling onto the engine, a deflecting hood 21 is supported within the traction wheel and over the engine, substantially as shown in Fig. 2. This deflecting hood is preferably made nearly as wide as the traction wheel and is supported on the non-rotary cross shafts or rods 7.

The numeral 22 indicates the driver's seat, the bar 23 of which is shown as attached to the rear portion of the truck frame. In Fig. 2, the numeral 25 indicates a draw bar, parts of which are broken away, attached to the rear portion of the truck frame.

With the tractor constructed as described, the line of travel of a gang plow, or any other implement or vehicle attachment to the drawbar 25 will pull on a line far below the axis of the traction wheel, and consequently, will offset, to a very great extent, at least the tendency of the front wheels and front portion of the truck frame to be raised from the ground under the re-action from the driving force transmitted from the engine to the said traction wheel. Also, the size of the traction wheel will make it easy to run over irregular ground, and its wide face will prevent it from sinking into soft ground, and from packing, excessively, the surface of the ground over which it travels.

As the engine is located within the traction wheel, its weight will be entirely and directly applied to the traction wheel, so that a maximum weight on the traction wheel and a maximum traction is obtained.

What I claim is:

1. In a tractor, the combination with a large wide-faced annular traction wheel, of a truck frame completely surrounding said traction wheel, said wheel having laterally spaced internal annular flanges, laterally and longitudinally spaced guide rollers supported by and journaled to the sides of said frame, and engaging the internal annular flanges of said wheel, and an engine supported by the sides of said frame located within said traction wheel and having connections for driving the same, the said frame also having a steering wheel.

2. In a tractor, the combination with a truck frame, wheel-supported at its front end, of a large wide-faced annular traction wheel having an annular gear and laterally spaced wheel engaging rims, of longitudinally spaced cross shafts on said truck frame extended transversely through said traction wheel, provided with rollers engaging the annular rims of said traction wheels, to thereby journal said traction wheel to said truck frame, a motor supported by said truck frame and located within said traction wheel, and an engine-driven transmission mechanism including a pinion engaging the annular gear of said traction wheel.

3. In a tractor, the combination with a truck frame, of an annular traction wheel journaled thereto, said frame having side members that embrace said wheel, a motor support carried by the sides of said frame and extended through said wheel, a motor carried on said motor support, located within said traction wheel and having connections for driving the same, a hood overlying said engine within said wheel, and connections carried by the sides of said frame for supporting said hood.

In testimony whereof I affix my signature in presence of two witnesses.

GEORGE C. LOBB.

Witnesses:
   J. E. RORMAN,
   R. M. LOBB.

Copies of this patent may be obtained for five cents each, by addressing the "Commissioner of Patents, Washington, D. C."